United States Patent [19]

Das

[11] 4,083,801

[45] Apr. 11, 1978

[54] HIGH PURITY ACTIVATED CARBON PRODUCED BY CALCINING ACID LEACHED COAL CONTAINING RESIDUAL LEACHING SOLUTION

[75] Inventor: Subodh K. Das, Natrona Heights, Pa.

[73] Assignee: Aluminum Company of America, Pittsburgh, Pa.

[21] Appl. No.: 752,420

[22] Filed: Dec. 20, 1976

[51] Int. Cl.$^2$ .................. C01B 31/12; B01J 21/18
[52] U.S. Cl. .................................. 252/422; 423/449
[58] Field of Search ............. 252/422, 421, 444, 445; 423/449, 461

[56] References Cited

U.S. PATENT DOCUMENTS

| 2,040,931 | 5/1936 | Fuchs | 252/423 |
|---|---|---|---|
| 2,312,707 | 3/1943 | Fuchs | 252/422 |
| 3,630,959 | 12/1971 | Kiikka | 252/422 |
| 3,876,505 | 4/1975 | Stoneburner | 252/445 |
| 3,884,830 | 5/1975 | Grant | 252/421 |
| 3,993,455 | 11/1976 | Reggel et al. | 423/461 |
| 3,998,604 | 12/1976 | Hinkley | 252/421 |
| 4,014,817 | 3/1977 | Johnson et al. | 252/421 |

FOREIGN PATENT DOCUMENTS 1,086,864  10/1967  United Kingdom .................. 252/421

*Primary Examiner*—Winston A. Douglas
*Assistant Examiner*—P. E. Konopka
*Attorney, Agent, or Firm*—Andrew Alexander

[57] ABSTRACT

A process for the production of activated carbon from coal comprises contacting the coal with mineral acids to leach impurities therefrom and removing the leached coal from the mineral acids. Activated carbon is produced by calcining the leached coal at a temperature in the range of 550° to 775° C.

9 Claims, 1 Drawing Figure

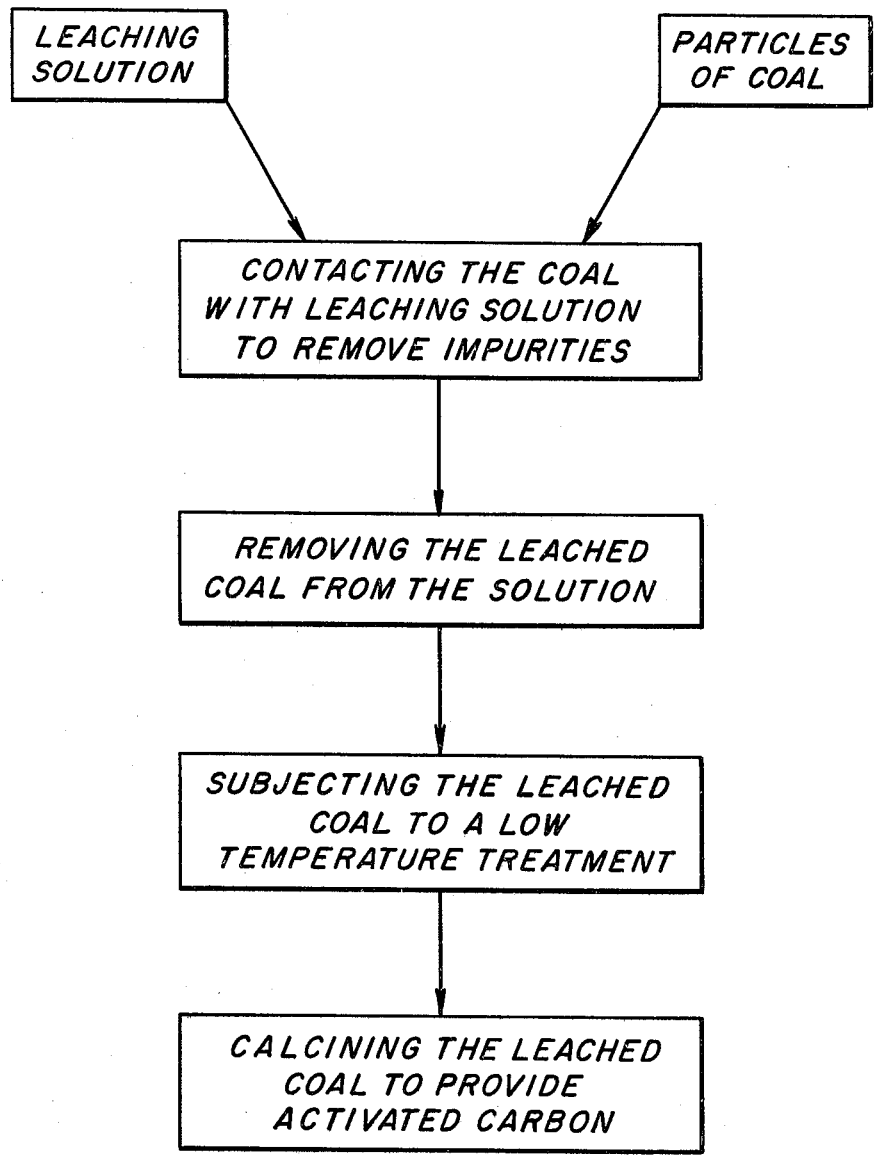

HIGH PURITY ACTIVATED CARBON PRODUCED BY CALCINING ACID LEACHED COAL CONTAINING RESIDUAL LEACHING SOLUTION

INTRODUCTION

This invention relates to activated carbon and more particularly to the production of high purity activated carbon from coal.

In the prior art, activated carbon has often been produced from petroleum coke. However, because of the escalating cost and concern over the availability of such coke sources, considerable research has been expended in evaluating coal as an economic source of activated carbon. However, using coal as a source of activated carbon can present problems because of the high level of impurities that can be present therein, which impurities if the activated carbon is used as a reducing media, for example, can contaminate the product produced.

SUMMARY OF THE INVENTION

It is therefore a general object of this invention to provide activated carbon from coal.

Another object of this invention is to provide a process for providing high purity activated carbon from coal.

In accordance with these objectives, a process for the production of activated carbon from coal comprises contacting the coal with a leaching solution, for example a mineral acid, to remove impurities therefrom. Thereafter, the leached coal is removed from the leaching solution, and residual leaching solution is permitted to remain therein. Then, the leached coal is calcined at a temperature in the range of 550° to 775° C to provide the activated carbon. In a preferred embodiment, the particles of coal are leached with a combination of nitric and hydrofluoric acid and thereafter, while still containing residual leaching solution, dried for a period of 15 minutes to 120 minutes at a temperature in the range of 80° to 140° C to initiate swelling of the particles. Thereafter, the swollen particles are calcined at a temperature in the range of 550° to 775° C to provide high purity activated carbon.

BRIEF DESCRIPTION OF THE DRAWING

FIGURE 1 is a flow chart illustrating a method of providing activated carbon in accordance with the invention.

DETAILED DESCRIPTION OF THE PREFERRED EMBODIMENTS OF THE INVENTION

In the flow chart of FIGURE 1, there is provided a schematic of a process for providing activated carbon from coal. Coal particles are contacted with a leaching solution to remove impurities. Thereafter, the coal particles are separated from the solution and, while permitting residual leaching solution to remain therein, then subjected to a controlled heating or calcination process which swells the particles thereby providing activated carbon.

Coal which can be processed in accordance with the present invention to provide activated carbon includes anthracite, bituminous and brown coal or the like. However, it is preferred to use bituminous coal as a source of coal for use in the present invention because such coal lends itself to more efficient beneficiation. The beneficiation referred to is a preferred aspect of the present invention. That is, preferably, the coal, prior to subjection to the leaching solution, is subjected to initial beneficiation or mechanical separation such as well known to those skilled in the art to reduce impurities to a low level at the beginning of the process. From an economic view, bituminous coal is more cheaply beneficiated initially than the other coals referred to. In addition, coal to be treated in accordance with the present invention should be provided in a particle size not greater than 8 mesh (Tyler Series), preferably, not greater than 48 mesh (Tyler Series).

The leaching solutions referred to can include most treatments which substantially reduce the impurity level of the coal to a level which does not interfere with the end use of the activated carbon. Thus, the leaching treatment can include several leaching steps. That is, after the initial beneficiation, the coal particles can be subjected first to a caustic leach to selectively remove impurities such as sulfur or to form products which can be removed in subsequent treatments. Thus, after the caustic treatment, the coal particles may be subjected to a mineral acid treatment to further reduce impurities. Such acids may be selected from the group consisting of $HNO_3$ and HF. It should be understood that it may be advantageous to treat the coal particles directly with mineral acid after the initial beneficiation.

In a preferred embodiment of the present invention, the coal to be purified, after initial beneficiation, is treated with a leaching solution containing hydrofluoric acid and at least one oxidizing agent selected from the group consisting of nitric acid, hydrogen peroxide and ferric sulfate. In addition, a gaseous oxidizing material selected from the group consisting of air and oxygen is preferably bubbled through the leaching solution during the leaching process to facilitate removal of impurities by providing additional oxidizing material and mixing action. With respect to the mixing action, it can also be provided mechanically or by use of an inert gas, but on a less preferred basis. It is further preferred that the leaching solution contains about 2 to 25 wt.% nitric acid and 0.5 to 10 wt.% hydrofluoric acid, the remainder essentially water.

Leaching of the coal is facilitated by keeping the concentrations of coal in leaching solution in the range of 50 to 200 gms/liter. In addition, the time of contacting the coal with leaching solution should be in the range of 7 to 100 minutes and the temperature during contacting should be in a range of about 20° to 100° C.

After the coal has been leached to lower impurities to an acceptable level, it is removed from the leaching solution. Preferably, there should remain in the leached coal residual leaching material. That is, 20 to 55% and preferably 30 to 50% of the leaching solution can remain in the leached coal. This residual leaching material is an important aspect of the present invention as will be seen hereinafter.

After removal from the leaching solution by filtration, for example, the coal particles are preferably subject to a low temperature drying and swelling treatment. Such treatment should be carried out at a temperature in the range of 80° to 140° C for 5 to 120 minutes. This treatment increases the size of the coal particles and also increases the surface area thereof by swelling and by formation of holes or pores. By this treatment, the dry bulk density of bituminous coal particles is reduced by up to 45%.

While the inventors do not necessarily wish to be bound by any theory of invention, it is believed that the residual leaching solution aids in the swelling and generally in increasing the surface area of the coal particles. It is thought that a film of leaching solution coats the coal particles and somehow acts to initially prevent or resist volatile matter within the particles escaping, thus causing the particles to swell. The swelling of the particle creates spaces, voids and openings throughout the extent of the particle thereby decreasing its density and increasing its surface area.

After the low temperature treatment, the swollen particles are subjected to a calcination treatment at a temperature in the range of 550° to 775° C for a time period capable of producing activated carbon. A preferred calcination treatment is in the range of 600° to 700° C. As a result of the calcination treatment the size of the particles is increased. Thus, in accordance with the aforementioned proposed theory, the dry bulk density of the coal particles can be decreased up to 45%. Accordingly, the surface area of the particles has been increased to provide many reactive sites thus forming activated carbon. The calcining treatment is an important aspect of the invention and in order to provide activated carbon, the aforementioned temperatures should be closely adhered to. For example, if a calcination temperature substantially in excess of 775° C is used, the surface of the carbon particles can be greatly diminished resulting in lowered chemical reactivity. This reduction in degree of reactivity, although not completely understood, is believed to result, in part, from the particles becoming less porous. In any event, the carbon particles are to a large extent deactivated at calcination treatments higher than 775° C. With respect to the time of calcining at the aforementioned temperatures, a suitable time is in the range of 5 minutes to 2 hours.

The following example is further illustrative of the invention. Indiana 6 bituminous coal, ground to a mesh size (Tyler) of −48/+100, was treated in a solution containing 18% $HNO_3$, 4% HF, the remainder water. The concentration of coal in leaching solution was 100 gms/liter. The coal was leached for 60 minutes at 85° C and thereafter separated from the leaching solution by filtration. The leached coal, containing residual leaching solution on the surface and pores thereof, was treated at 107° C for 2 hours and then calcined at 650° C for 30 minutes, thereby providing activated carbon. By this treatment the surface area was increased from 12 $m^2$/gm to 288 $m^2$/gm. In addition, after the leaching step, the coal was analyzed and ash was reduced from 4.29 to 0.16%, Fe was lowered from 0.87 to 0.01% and Si from 0.7 to 0.004%.

While the invention has been described in terms of preferred embodiments, the claims appended hereto are intended to encompass other embodiments which fall within the spirit of the invention.

Having thus described the invention and certain embodiments thereof, I claim:

1. A process for the production of high purity activated carbon from coal, the process comprising:
    (a) contacting particles of said coal with a leaching solution containing 0.5 to 10 wt.% hydrofluoric acid and at least one oxidizing agent selected from the group consisting of $HNO_3$ in the range of 2 to 25 wt.% and $H_2O_2$, the remainder essentially water, thereby leaching impurities from said coal;
    (b) removing 50 to 70% of the leaching solution from the coal; and
    (c) calcining said coal containing residual leaching solution in the range of 30 to 50 wt.%, said calcining being carried out at a temperature in the range of 550° to 750° C for a period of time sufficient to provide said high purity activated carbon.

2. The process according to claim 1 wherein the oxidizing agent is nitric acid.

3. The process according to claim 1 wherein a gaseous oxidizing material is bubbled through said leaching solution during said contacting period.

4. The process according to claim 1 wherein said gaseous oxidizing material is selected from the group consisting of air and oxygen.

5. The process according to claim 1 wherein the leaching solution has a temperature in the range of 20° to 100° C.

6. The process according to claim 1 wherein said calcination is for a time period in the range of 5 to 120 minutes.

7. The process according to claim 1 wherein the leached coal containing said residual leaching solution is subjected to a temperature in the range of 80° to 140° C after said removing step.

8. The process according to claim 7 wherein the coal particles are subject to said temperature for a period in the range of 5 to 120 minutes.

9. A process for the production of high purity activated carbon from coal comprising:
    (a) contacting said coal having a particle size not greater than 14 mesh (Tyler Series) with a leaching solution containing 0.5 to 10 wt.% hydrofluoric acid and 2 to 25 wt.% nitric acid, the remainder essentially water, said solution at a temperature in the range of 20° to 100° C, said contacting for a time period in the range of 7 to 100 minutes;
    (b) during said contacting, bubbling a gaseous oxidizing material selected from the group consisting of air and oxygen;
    (c) separating said coal from said leaching solution and leaving in said coal 30 to 50 wt.% residual leaching solution;
    (d) subjecting said coal containing said residual leaching solution to a temperature in the range of 80° to 140° C for a time period in the range of 5 to 120 minutes; and
    (e) thereafter, calcining said coal at a temperature in the range of 550° to 750° C for a time period in the range of 5 to 120 minutes to provide a reduction in the bulk density of said coal in the range of 5 to 45% thereby producing said high purity activated carbon.

* * * * *